United States Patent
Chowdhary et al.

(10) Patent No.: US 11,829,155 B2
(45) Date of Patent: Nov. 28, 2023

(54) SYSTEM AND METHOD FOR NAVIGATING UNDER-CANOPY ROBOTS USING MULTI-SENSOR FUSION

(71) Applicant: Earthsense, Inc., Champaign, IL (US)

(72) Inventors: Girish Chowdhary, Champaign, IL (US); Akihiro Higuti, Champaign, IL (US); Andres Eduardo Baquero Velasquez, Urbana, IL (US)

(73) Assignee: EARTHSENSE, INC., Champaign, IL (US)

( * ) Notice: Subject to any disclaimer, the term of this patent is extended or adjusted under 35 U.S.C. 154(b) by 0 days.

(21) Appl. No.: 18/110,131

(22) Filed: Feb. 15, 2023

(65) Prior Publication Data

US 2023/0259142 A1 Aug. 17, 2023

Related U.S. Application Data

(60) Provisional application No. 63/310,257, filed on Feb. 15, 2022.

(51) Int. Cl.
| | | |
|---|---|---|
| *G05D 1/02* | (2020.01) | |
| *G01S 19/48* | (2010.01) | |
| *G01S 17/931* | (2020.01) | |
| *G05D 1/00* | (2006.01) | |

(52) U.S. Cl.
CPC .......... *G05D 1/0274* (2013.01); *G01S 17/931* (2020.01); *G01S 19/485* (2020.05); *G05D 1/0088* (2013.01); *G05D 2201/0201* (2013.01)

(58) Field of Classification Search
CPC ... G05D 1/0274; G01S 17/931; G01S 19/485; G01S 1/0088
See application file for complete search history.

(56) References Cited

U.S. PATENT DOCUMENTS

| | | | |
|---|---|---|---|
| 6,671,582 B1 * | 12/2003 | Hanley | A01B 79/005 47/1.01 R |
| 9,582,002 B2 * | 2/2017 | Cavender-Bares | G05D 1/0011 |
| 10,070,577 B2 * | 9/2018 | Cavender-Bares | G05D 1/0274 |
| 10,452,070 B2 * | 10/2019 | Greenfield | G05D 1/0212 |
| 10,874,044 B2 * | 12/2020 | Cavender-Bares | G05D 1/0274 |
| 11,277,956 B2 * | 3/2022 | Bertucci | G06V 20/56 |
| 11,277,957 B2 * | 3/2022 | Bertucci | G06F 16/29 |
| 11,363,754 B2 * | 6/2022 | Bertucci | G06F 16/29 |
| 2007/0193798 A1 * | 8/2007 | Allard | B62D 1/286 180/169 |
| 2016/0124433 A1 * | 5/2016 | Cavender-Bares | A01C 23/008 111/119 |

(Continued)

*Primary Examiner* — Luis A Martinez Borrero
(74) *Attorney, Agent, or Firm* — Shumaker, Loop & Kendrick, LLP

(57) ABSTRACT

A system and a method for navigating a robot. The system receives a target location, a field map, sensor data from a robot, and a robot location. The sensor data may include image data and kinetic data. Further, the system may determine a navigation mode based on the sensor data and the robot location. The navigation mode may be one of an under-canopy mode, an out-row mode, and a recovery mode. Further, the system may generate a reference map comprising a path for the robot to follow to reach the target location based on the navigation mode, the field map, and the target location. Finally, the system may be configured to navigate the robot based on the reference map.

19 Claims, 8 Drawing Sheets

(56) References Cited

U.S. PATENT DOCUMENTS

| | | | |
|---|---|---|---|
| 2016/0157414 A1* | 6/2016 | Ackerman | A01B 69/008 701/25 |
| 2017/0223889 A1* | 8/2017 | Cavender-Bares | A01C 21/005 |
| 2018/0100740 A1* | 4/2018 | Seo | A01B 69/008 |
| 2019/0069475 A1* | 3/2019 | Cavender-Bares | G05D 1/0088 |
| 2019/0086924 A1* | 3/2019 | Greenfield | B60W 30/00 |
| 2019/0239416 A1* | 8/2019 | Green | A01B 69/007 |
| 2020/0029488 A1* | 1/2020 | Bertucci | G06V 20/56 |
| 2020/0029489 A1* | 1/2020 | Bertucci | A01B 69/008 |
| 2020/0029490 A1* | 1/2020 | Bertucci | G06V 20/58 |
| 2020/0057431 A1* | 2/2020 | Bank | A01B 69/001 |
| 2021/0112704 A1* | 4/2021 | Cavender-Bares | G05D 1/0088 |
| 2021/0132608 A1* | 5/2021 | Cavender-Bares | B25J 5/007 |
| 2021/0158041 A1* | 5/2021 | Chowdhary | G05D 1/0278 |
| 2022/0118555 A1* | 4/2022 | Sibley | B23K 26/361 |
| 2022/0147053 A1* | 5/2022 | Lin | G06N 20/00 |
| 2022/0179424 A1* | 6/2022 | Donath | G01S 19/42 |
| 2022/0196433 A1* | 6/2022 | Eneev | G06V 20/70 |
| 2022/0313855 A1* | 10/2022 | Byrnes | B25J 9/1664 |
| 2022/0317691 A1* | 10/2022 | Eskandari | A01B 69/008 |
| 2022/0317702 A1* | 10/2022 | Chowdhary | G05D 1/0088 |
| 2022/0318552 A1* | 10/2022 | Chowdhary | G06T 7/50 |
| 2022/0398825 A1* | 12/2022 | Gao | G06V 10/464 |
| 2023/0011864 A1* | 1/2023 | Shmueli | A01B 69/008 |
| 2023/0117386 A1* | 4/2023 | Hu | G01S 17/42 356/4.01 |

* cited by examiner

500

302

SYSTEM AND METHOD FOR NAVIGATING UNDER-CANOPY ROBOTS USING MULTI-SENSOR FUSION

PRIORITY INFORMATION

This application claims the benefit under 35 U.S.C. § 119(e) of U.S. Provisional Patent Application Ser. No. 63/310,257, filed Feb. 15, 2022, entitled "MULTI-SENSOR FUSION BASED ROW FOLLOWING FOR UNDER-CANOPY ROBOTS," the entire contents of which is incorporated by reference herein.

TECHNICAL FIELD

The present subject matter described herein, in general, relates to navigation of robotic systems in an agricultural field, and, more particularly, to reliably and accurately navigating robotic systems in agricultural fields to perform agricultural activities.

BACKGROUND

Robotics and digital agriculture technologies hold exciting potential in improving sustainability, productivity, and access to agriculture. In recent years, the use of agricultural robots to boost production and efficiency in the farming sector has grown. However, one of the biggest challenges in using agricultural robots is navigation. Ensuring that the robots move safely and accurately through fields while performing tasks such as planting, harvesting, and monitoring crops are essential to the success of these systems.

Conventional navigation methods for agricultural robots rely on GPS, which can be limited by signal interference and accuracy issues. This can result in the robots moving off course or colliding with obstacles, leading to wasted time, resources, and potential damage to crops.

SUMMARY

Before the present system(s) and method(s), are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for navigating a robot. This summary is not intended to identify essential features of the claimed subject matter, nor is it intended for use in determining or limiting the scope of the claimed subject matter.

In one implementation, a method for navigating a robot is disclosed. The robot may be at least a field robot, an agricultural robot, an aerial robot, a drone, and the like. The method may comprise receiving a target location, a field map, sensor data from a robot, and a robot location. It may be noted that the target location may comprise one or more checkpoints and a destination. The one or more checkpoints may be considered as the destination one after the other until all of the one or more checkpoints are crossed by the robot. The field map may be a digital representation of an area through which the robot may be navigated. The field map may include accurate representations of the physical features and layout of the area, such as crop rows, obstacles, and boundaries, to allow the robot to effectively navigate and perform tasks within the area. The sensor data may include kinetic data and image data. The robot location may be received from one or more location sensors including GNSS (Global Navigation Satellite Systems) and GPS (Global Positioning System).

Further, the method may comprise determining a navigation mode based on the robot location and the sensor data using a supervision model. The navigation mode is at least one of an under-canopy mode, an out-row mode, and a recovery mode. Further a reference map may be generated based on the navigation mode using the supervision model. The reference map may comprise a path to be followed by the robot to reach the target location and images of surroundings of the robot. The reference map may be generated using GNSS data, GPS data, the field map, and location of the robot. Finally, the method may comprise navigating the robot based on the reference map using at least a control model, and a path tracking model. The robot may be navigated by at least one of accessing GNSS, Real-Time Kinematics (RTK), and a waypoint data when the robot may be in the out-row mode, analyzing Light Detection And Ranging (LiDAR) perception data when the robot may be in the under-canopy mode, and generating a recovery reference path when the robot may be in the recovery mode. The waypoint data may be recorded by a manually controlled robot. It may be noted that the waypoint data may be included in the field map. The waypoint data may comprise at least an entry point, and an exit point for a row in an agricultural field.

In another implementation, a non-transitory computer-readable medium embodying a program executable in a computing device for navigating a robot is disclosed. The robot may be at least a field robot, an agricultural robot, an aerial robot, a drone, and the like. The program may comprise a program code for receiving a target location, a field map, sensor data from a robot, and a robot location. The target location may be a destination. It may be noted that the target location may comprise one or more checkpoints and a destination. The one or more checkpoints may be considered as the destination one after the other until all the one or more checkpoints are crossed. The field map may be a digital representation of an area through which the robot may be navigated. The field map may include accurate representations of the physical features and layout of the area, such as crop rows, obstacles, and boundaries, to allow the robot to effectively navigate and perform tasks within the area. The sensor data may include kinetic data and image data. The robot location may be received from one or more location sensors including GNSS (Global Navigation Satellite Systems) and GPS (Global Positioning System).

Further, the program may comprise a program code for determining a navigation mode based on the robot location and the sensor data using a supervision model. The navigation mode is at least one of an under-canopy mode, an out-row mode, and a recovery mode. Further a reference map may be generated based on the navigation mode using the supervision model. The reference map may comprise a path to be followed by the robot to reach the target location and images of surroundings of the robot. The reference map may be generated using GNSS data, GPS data, the field map, and location of the robot. Finally, the program may comprise a program code for navigating the robot based on the reference map using at least a control model, and a path tracking model. The robot may be navigated by at least one of accessing GNSS, Real-Time Kinematics (RTK), and a waypoint data when the robot may be in the out-row mode, analyzing Light Detection And Ranging (LiDAR) perception data when the robot may be in the under-canopy mode, and generating a recovery reference path when the robot may be in the recovery mode. The waypoint data may be recorded by a manually controlled robot. It may be noted that the waypoint data may be included in the field map. The waypoint data may comprise at least an entry point, and an exit point for a row in an agricultural field.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for navigating a robot disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
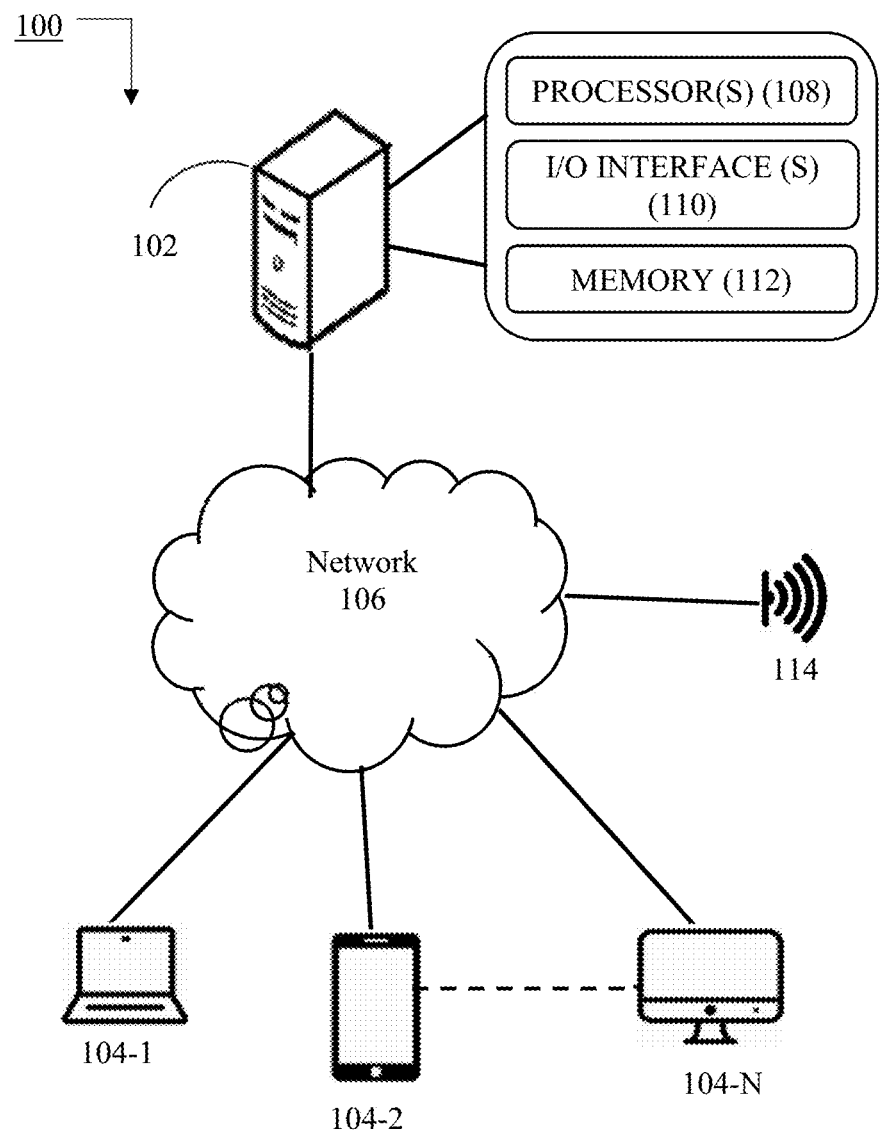
FIG. 1 illustrates a network implementation for navigating a robot, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "determining," "generating," "navigating," "accessing," "analyzing," and other forms thereof, are intended to be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for navigating a robot. In an embodiment, the system may be implemented on a robot. The robot may be a machine, an unmanned aerial vehicle, and a field robot. The robot may have a plurality of sensors and one or more mechanical equipment mounted on it. In another embodiment, the system may be implemented on a remote server using cloud storage. The system may receive data from the robot and may transmit data back to the robot upon processing the received data for a task. The task may be to control the robot for an agricultural treatment. In an embodiment, the task may be to control a fleet of robots simultaneously. The system may receive a target location, a field map, sensor data from a robot, and a robot location. Further, the system is configured to determine a navigation mode based on the robot location and the sensor data using a supervision model. The navigation mode may be at least one of an under-canopy mode, an out-row mode, and a recovery mode. The sensor data may comprise kinetic data and image data. Subsequently, a reference map may be generated based on the navigation mode using the supervision model. Finally, the system may be configured to navigate the robot based on the reference map using at least a control model, and a path tracking model. It may be noted that the robot may be navigated using one or more methods depending on the navigation mode. Each method of the one or more methods may use a different set of sensors.

Certain technical challenges exist in navigating a robot. One technical challenge faced while navigating the robot through an agricultural field having crops planted in rows that may form canopies over the robot is that the crop canopies may interfere with GPS signals. The interference may lead to inaccurate navigation of the robot causing damage to at least the robot, and the crops. The solution presented in the embodiments disclosed herein to address the above problem is using a supervision model to determine a navigation mode based on a location of the robot and sensor data. The system may analyze the sensor data and the location of the robot to determine the suitable navigation mode out of an under-canopy mode, an out-row mode, and a recovery mode. The system is configured to automatically switch between methods used to navigate the robot based on the navigation mode. It may be noted that different methods may comprise use of different sensors.

Another technical challenge faced may be that the robot may get stuck due to insufficient traction on a terrain in the agricultural field. The solution presented in the embodiments disclosed herein to address the above problem is using a recovery model to generate a recovery reference path. It may be noted that the traction between wheels of the robot and the ground is continuously monitored using one or more kinetic sensors. Therefore, failure to navigate the robot is detected in real-time. Further, the recovery model may be triggered to generate a recovery reference map for the robot to follow in order to recover from navigation failure. The recovery model may use sensor data to generate the recovery reference map based on historic values of traction, a field map comprising layout of an agricultural field where the robot is traversing, and image data comprising images of surroundings of the robot.

Referring now to FIG. 1, a network implementation 100 of a system 102 for navigating a robot is disclosed. Initially, the system 102 receives a target location, a field map from a user through a graphical user interface (GUI), and sensor data from a robot, and a robot location using location sensors. In an example, the user may use an application installed on a user device 104-1 having the GUI to input the target location and the type of agricultural treatment. It may be noted that the one or more users may access the system 102 through one or more user devices 104-1, 104-2 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, or a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

The system 102 may receive sensor data from a set of sensors 114. The set of sensors may include image sensors, kinetic sensors, LIDAR, location sensors, interoceptive sensors, exteroceptive sensors and the like installed on the robot.

As there are various challenges observed in the existing art, the challenges necessitate the need to build the system 102 for navigating a robot. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The system as described herein is configured to execute a set of instructions for navigating a robot. In an embodiment, the system may receive a target location, a field map, sensor data from a robot, and a robot location. The field map may be a digital representation of an area through which the robot may be navigated. The field map may include accurate representations of the physical features of the area, such as crop rows, obstacles, and boundaries, to allow the robot to effectively navigate and perform tasks within the area. The sensor data may include kinetic data and image data. The robot location may be received from one or more location sensors including GNSS (Global Navigation Satellite Systems) and GPS (Global Positioning System). The target location may be at least one of a part of an agricultural field, a plantation, and one or more trees in an orchard. The kinetic data may comprise traction, angular momentum, a head direction, a forward velocity, and an angular velocity of the robot. The kinetic data may be received from sensors installed on the robot.

Further, the system may determine a navigation mode based on the robot location and the sensor data using a supervision model. The navigation mode may be one of an under-canopy mode, an out-row mode, and a recovery mode. The under-canopy mode may correspond to navigating the robot when the robot may be traversing in a location covered by plant leaves forming a canopy. In the under-canopy mode, the robot may be navigated using image data, kinetic data and one or more machine learning models. In an embodiment, the under-canopy mode may correspond to navigating the robot without using GPS and GNSS. The out-row mode may correspond to navigating the robot when the robot may be traversing in a location outside rows in an open area.

The system may determine the robot location based on GPS data and GNSS data, and by processing sensor data like images of surroundings of the robot having no rows of crops on sides of the robot. In the out-row mode, the robot may be navigated using at least one of GPS data, GNSS data, and image data. The recovery mode may correspond to navigating the robot when the robot may have stopped traversing. The supervision model may be trained using a training data comprising labelled sensor data, wherein the sensor data is labelled with a navigation mode. The supervision model is trained using at least one of a supervised learning technique, reinforcement learning technique, and a self-supervised learning technique. In an embodiment, the supervision model may be trained using a training dataset comprising a plurality of robot locations, corresponding plurality of sensor data recorded at the plurality of robot locations, a navigation mode for each of the robot location and corresponding sensor data. The supervision model may use image processing algorithms, matching algorithms, self-learning techniques and reinforcement learning techniques for training based on the training dataset. Further, the supervision model may be trained to determine a navigation mode as an output for an input of a robot location and sensor data from the robot at the robot location. It may be noted that the supervision model may be able to determine the navigation mode for a robot location and sensor data unavailable in the training dataset. In an embodiment, the robot location may be received using GPS and GNSS.

It may be noted that the sensor data may comprise kinetic data and image data. The kinetic data may comprise traction, angular momentum, a head direction, a forward velocity, and an angular velocity. The image data may comprise at least one or more images of areas surrounding the robot, and 3D models. The one or more images may be at least depth images and Red Green Blue (RGB) images. The 3D models may be captured using ranging sensors like Light Detection And Ranging (LIDAR), Sound Navigation And Ranging (SONAR), Radio Detection And Ranging (RADAR), and the like.

Figure 3:
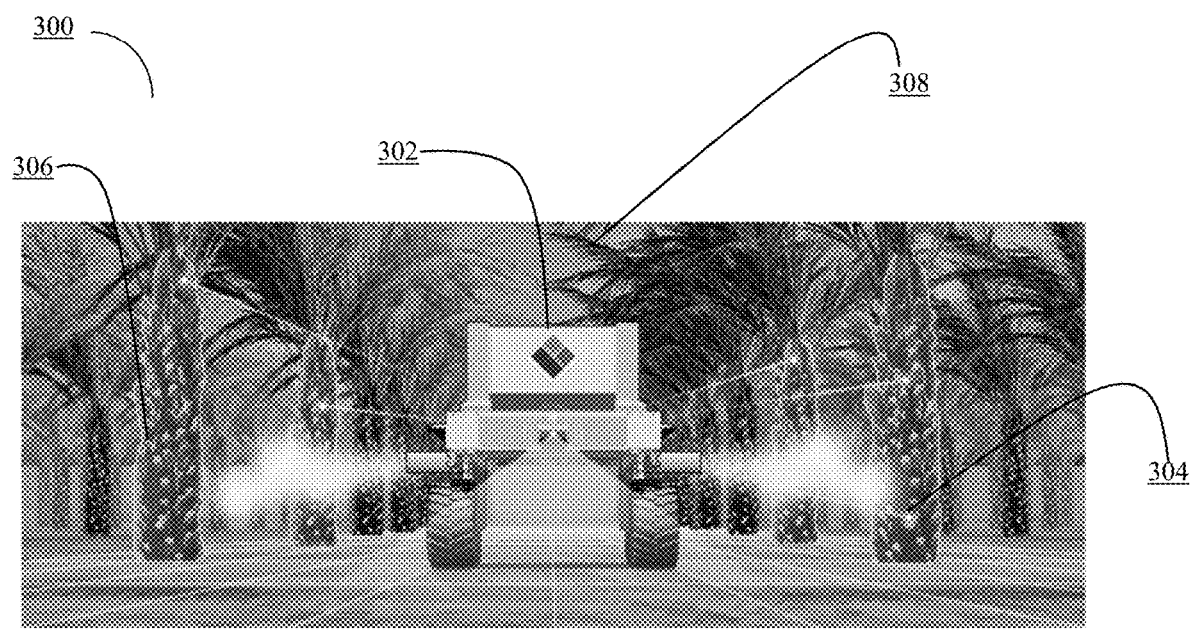
FIG. 3 illustrates an example of a robot in the under-canopy mode, in accordance with an embodiment of the present subject matter.

Consider an example illustrated in FIG. 3, let us assume that the system receives the robot location that is marked in between a row of crops on the field map. Further, the system receives sensor data comprising images of surroundings of the robot comprising crops and plant canopies. The system may use the supervision model to determine the navigation mode. In an embodiment, the supervision model may compare the received images in the sensor data to one or more images in the training dataset. Further, the supervision model may identify images from the training dataset similar to the received images. Further, the supervision model may determine the navigation mode for the robot based on the navigation mode corresponding to the similar images in the training dataset. In the example, the supervision model may determine the navigation mode to be "under-canopy mode.

Figure 4:
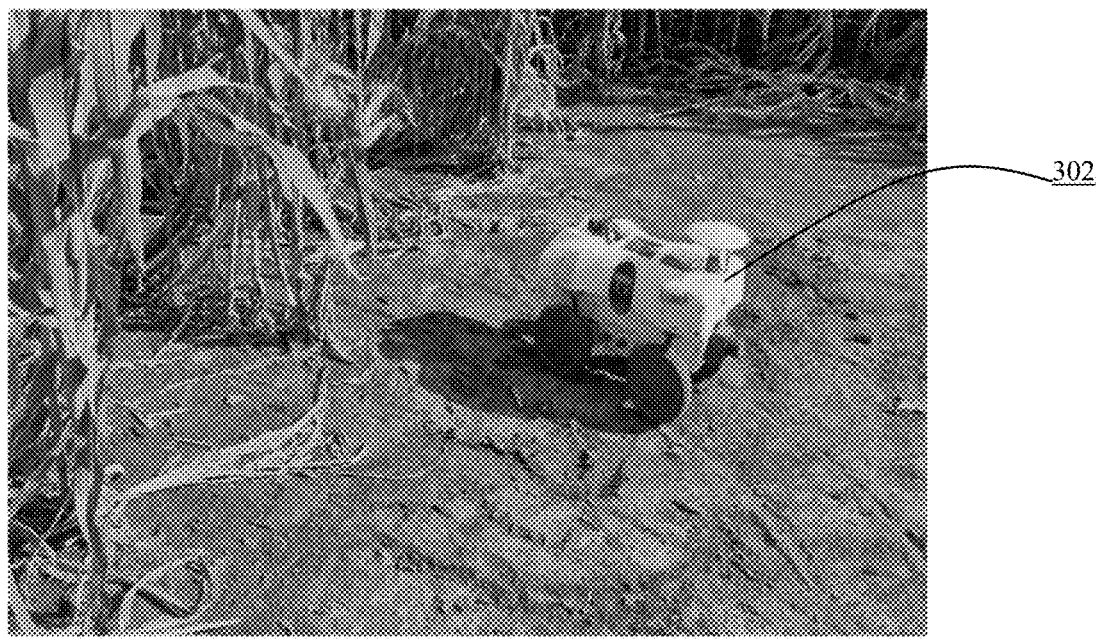
FIG. 4 illustrates an example of a robot in the out-row mode, in accordance with an embodiment of the present subject matter.

Consider another example illustrated in FIG. 4, the supervision model may determine the navigation mode as "out-row mode" for the illustrated example. It may be noted that the system may receive kinetic data of the robot with the images. The kinetic data may be used to check if the robot is moving. In case the robot is not moving for a predefined amount of time, the system may analyse the kinetic data to check if the robot should be navigated using the recovery mode.

Further to determining the navigation mode, the system may be configured to generate a reference map based on the navigation mode using the supervision model. The reference map may comprise a path to be followed by the robot to reach the target location, and images of surroundings of the robot. The supervision model may use GNSS data, GPS data, the field map, and location of the robot to generate the reference map. In an embodiment, the supervision model may be trained using a plurality of field maps, a plurality of robot locations in the plurality of field maps, a plurality of corresponding GNSS data and GPS data recorded at the plurality of robot locations, a plurality of corresponding navigation modes at the plurality of robot locations in the plurality of field maps, a plurality of target locations in the plurality of field maps, and a reference map for the robot to reach the plurality of target locations in the plurality of field maps from the corresponding robot locations in the plurality of field maps. The supervision model may be configured to generate a reference map for a robot as an output for an input of a field map, a target location, a navigation mode, a robot location, and GPS and GNSS data. In an embodiment, when the target location comprises one or more checkpoints, the reference map may be generated for one of the one or more checkpoints in a sequence provided by the user. For example, consider that the target location comprises checkpoint 1, checkpoint 2, checkpoint 3. Until the robot passes checkpoint 1, the checkpoint 1 may be considered as the target location to generate the reference map. In another embodiment, the system may generate a reference map considering checkpoint 3 as the target location including checkpoint 1 and checkpoint 2 in the reference map such that the system may generate the reference map only once instead of generating the reference map after each checkpoint.

Further to generating the reference map, the system may be configured to navigate the robot based on the reference map using at least a control model and a path tracking model. In an embodiment, the system may continuously track the robot location in an agricultural field using GPS and GNSS. Further, the system may use the control model in combination with the path tracking model to navigate the robot on the path to be followed for reaching the target location based on the reference map. The path tracking model may continuously track and monitor the robot's location and check whether the robot is following the path in the reference map. The path tracking model may be trained using supervised learning techniques and line tracking algorithms. The line tracking algorithms are trained to follow a line marked on a ground in a color distinguishable with respect to the ground. The line tracking algorithms detect edges the line using image sensors and use a continuous feedback loop to allow navigation. The continuous feedback loop checks if the robot is travelling over the line with the line at the center of the robot body and transmits feedback to turn the robot in case the line is not at the center of the robot. Further, the path tracking model may be trained to send feedback to the control model based on the robot location and the path in the reference map.

Subsequently, the control model may be trained to generate commands for the robot based on the feedback received from the path tracking model. As an example and not by way of limitation, the commands may comprise turn commands, speed commands, and movement commands. The turn commands may include turn directions including all the compass directions. In an embodiment, the turn commands may include right, left and, an angle of turn. The angle of turn may be a value between 0° and 360°. The angle of turn may correspond to sharpness of the turn command. The speed commands may include increase and decrease. The movement commands may include forward, reverse, and stop. The command model may be trained using navigation algorithms like AON (Autonomous Outdoor Navigation). The command model and the path tracking model communicate in a loop to navigate the robot on the path in the reference map.

In an embodiment, the system may be configured to use different sensors to navigate the robot based on the reference map for different navigation modes. Further, the system may be configured to automatically switch, in real-time, between the sensors when the navigation mode changes. It may be noted that the navigation mode of the robot may change as the robot moves. It may be noted that the system may be configured to process data from the different sensors using different algorithms to navigate the robot based on the reference map and the navigation mode.

The system may access GNSS, Real-Time Kinematics (RTK), and waypoint data when the robot may be in "out-row mode" to navigate the robot. The waypoint data may be recorded by a manually controlled robot. The waypoint data comprises at least an entry point, and an exit point for a row in an agricultural field. In an embodiment, the waypoint data may be included in the field map. The waypoint data corresponds to points marked on the field map that may indicate physical feature based on which the system may generate a command to navigate the robot. Consider an example, let us assume the field map comprises two rows (row 1 and row 2) of crops. The waypoint data in the field map comprises an entry point and an exit point for each row. The system may use the waypoint data to generate a reference map that may have a path for the robot connecting the entry point of row 2 to the exit point of row 1. It may be noted that the checkpoints may also be considered as waypoint data.

In case the navigation mode is "under-canopy mode", the system is configured to analyse LIDAR perception data and the image data. It may be noted that the LIDAR perception data may also be LIDAR data received from LIDAR sensors. The LIDAR perception data may comprise a 3-Dimensional (3D) model of surroundings of the robot. The image data may comprise RGB images and depth images of surroundings of the robot. It may be noted that the navigation mode may be "under-canopy mode" when the robot is travelling in between two rows. Therefore, the robot must travel without colliding into crops planted in the two rows maintaining a distance from each row. It may be noted that the distance may be predefined by a user. The system may be configured to receive LIDAR perception data from LIDAR sensors on the robot and analyse the LIDAR data and the image data using the path tracking model and the control model to navigate the robot in between the two rows. The control model may be trained to calculate distance between the robot and the crops planted in the rows using at least one of image processing algorithms like OpenCV™, neural networks trained using plurality of images and labelled distances in the plurality of images, and machine learning algorithms. Further, the path tracking model may be trained to send a feedback to the control model when the robot is not at the predefined distance from the two rows. In an embodiment, the path tracking model may be trained for different distances between the robot and the rows of crops. For example, one meter from row 1 and three meters from row 2. The row 1 may be the row to the left of the robot and row 2 may be the row to the right of the robot. In another embodiment, there may be more than two rows, the path tracking model may be trained to maintain the robot at a different distance for each pair of rows.

In an embodiment, the robot may fail to follow the commands from the control model. The path tracking model may identify that the robot is unable to follow the commands generated by the control model. The path tracking model may be trained to identify navigation failure when the robot location does not change for a time greater than a predefined threshold. In case of navigation failure, the supervision model may determine the navigation mode to be recovery mode. Further, the system may be configured to generate a recovery reference path for the robot to get back on the path in the reference map. In an embodiment, the system may predict a robot state, to detect navigation failure, using a sensor fusion method or a combination of one or more sensor fusion methods like Motion Horizon Estimator (MHE) and Extended Kalman Filter (EKF). The system uses an MHE that may be explained by the equation defined as may be defined as the Equation 1.

$$\dot{x}(t) = \begin{bmatrix} \dot{p}_x(t) \\ \dot{p}_y(t) \\ \dot{\theta}(t) \end{bmatrix} = \begin{bmatrix} \mu \cdot \cos(\theta(t)) & 0 \\ \mu \cdot \sin(\theta(t)) & 0 \\ 0 & v \end{bmatrix} \begin{bmatrix} v(t) \\ \omega(t) \end{bmatrix} \quad \text{Equation 1}$$

In the equation 1, x(t) is the state vector composed of $\dot{p}_x$, $\dot{p}_y(t)$ and $\dot{\theta}(t)$ representing position in x and y axis and heading angle, respectively, in the world coordinate frame. μ and v are unknown parameters and can be related to traction caused by the interaction between wheels of the robot and ground. μ and v may be equal to one when the robot follows the commands generated by the control model perfectly and equal to zero when the robot is stuck and fails to follow the commands generated by the control model. It may be noted that μ and v may be a value in the range of zero to one based on the difference between the commands generated by the control model and action performed by the robot to follow the command. v(t) and ω(t) are the velocity and angular velocities commanded to the wheels of the robot by the control model. The MHE also estimates Δθ to maintain the robot in the direction required to follow the path in the reference map. It may be noted that the system is configured to detect navigation failure when the value of μ is less than a predefined threshold.

In case of navigation failure, the recovery reference path may be generated using a recovery model. The recovery model may be trained using navigational algorithms such as, but not limited to, (Autonomous Outdoor Navigation (AON). In an embodiment, the recovery model may be trained using a training dataset comprising a plurality of field maps, a plurality of robot locations in the plurality of field maps, a plurality of sensor data corresponding to the plurality of robot locations, a plurality of recovery reference paths for the plurality of locations in the plurality of field maps. The recovery model may be continuously improved by retraining the recovery model based on kinetic data comprising traction received from the robot continuously. The kinetic data may be mapped to the robot location in the field map from where the kinetic data was recorded.

Further, the recovery model may detect a robot location with a steep decline in the traction such that the traction may continuously decline at every robot location after the detected robot location. Further, the recovery model may mark robot locations after the detected robot location as not suitable for the robot to improve the supervision model. Further, the recovery model may generate a recovery reference map comprising robot locations having high traction values that may be close to the robot location where navigation failure was detected. The recovery model may analyze image data received from the robot at past robot locations to identify a suitable path for the robot. The recovery model may be trained using image processing algorithms, a plurality of images of areas having different terrains, and a plurality of traction values corresponding to the areas. The recovery model may determine the traction values for areas in the images received from the robot comprising images of surroundings of the robot to generate the recovery reference path.

Further, the system may use the control model and the path tracking model to navigate the robot on the recovery reference path. The control model may be used to generate commands for the robot to follow the recovery reference path. The path tracking model may be used to monitor and track the robot location and generate feedback for the control model in case the robot deviates from the recovery reference path. In an embodiment, when the robot is unable to follow the recovery reference path, the path tracking model may generate an alert for the user to check the robot. The alert may comprise the location of the robot and the images received from the robot comprising images of surroundings of the robot.

Figure 2:
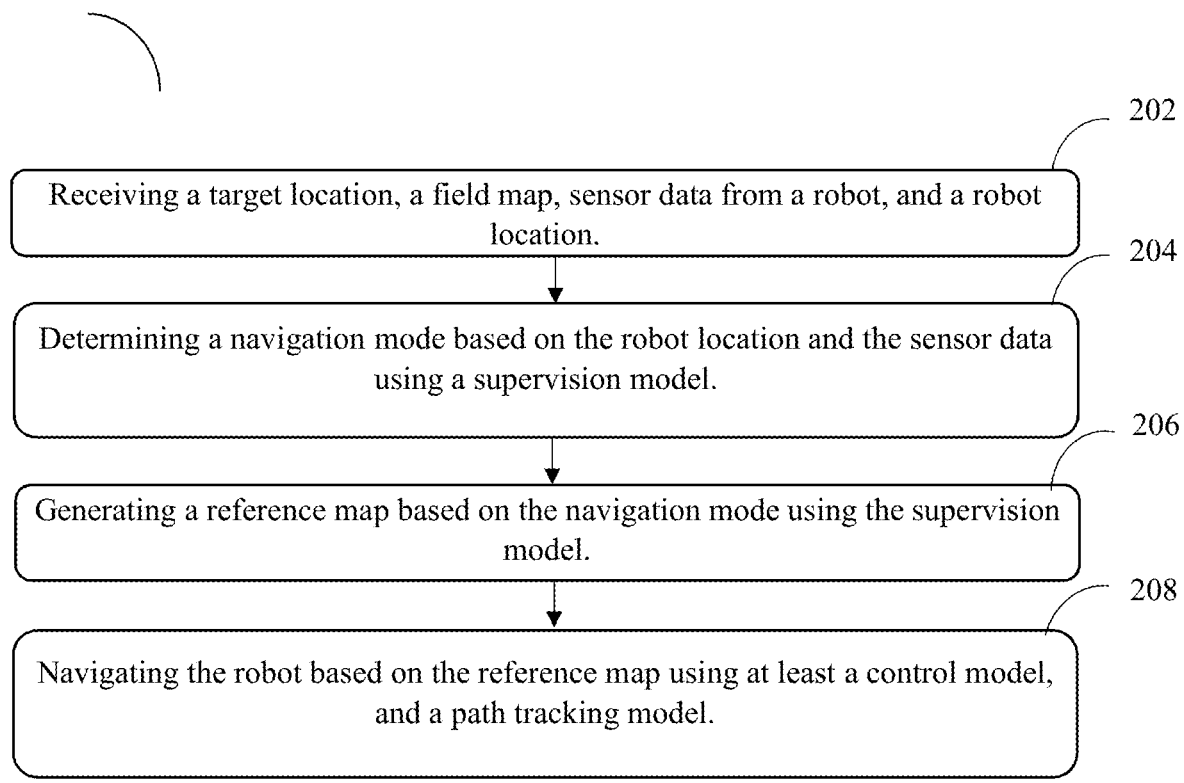
FIG. 2 illustrates a method for navigating a robot, in accordance with an embodiment of the present subject matter.

Referring now to FIG. 2, a method 200 for navigating a robot is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for navigating a robot. Furthermore, the method 200 for navigating a robot can be implemented in any suitable hardware, software, firmware, or combination thereof. However, for ease of explanation, in the embodiments described below, the method 200 may be considered to be implemented in the above-described system 102.

At block 202, a target location, a field map, sensor data from a robot, and a robot location may be received.

At block 204, a navigation mode may be determined based on the robot location and the sensor data. the navigation mode may be determined using a supervision model. The navigation mode may be one of an "under-canopy mode," an "out-row mode," and a "recovery mode."

At block 206, a reference map may be generated based on the navigation mode. The reference map may be generated using the supervision model.

At block 208, the robot may be navigated based on the reference map. The robot may be navigated using at least a control model, and a path tracking model.

Referring to FIG. 3, an example (300) of a robot (302) navigating in under-canopy mode. In the example, the robot (302) may be travelling between row 1 (304) and row 2 (306) under a canopy (308) formed by the crops planted in the row 1 and row 2. When the robot is under-canopy mode the system uses image data comprising LIDAR data and RGB images to navigate the robot between rows of crops. The system may measure distance of the robot from the rows of crops in RGB images and use a 3D model of surroundings of the robot created using LIDAR data.

Referring to FIG. 4, an example (400) of a robot (302) navigating in out-row mode. When the robot is in out-row mode, the system uses GPS data, GNSS data, waypoint data and robot location to navigate the robot from one row to another row based on the waypoint data using machine learning algorithms.

Figure 5:
FIG. 5 illustrates an example of a robot in recovery mode, in accordance with an embodiment of the present subject matter.

Referring now to FIG. 5, an example (500) of a robot (302) navigating in recovery mode. When the robot is in recovery mode, the system uses machine learning algorithms and sensor data to correct robot movement in case of navigation failure.

Figure 6:
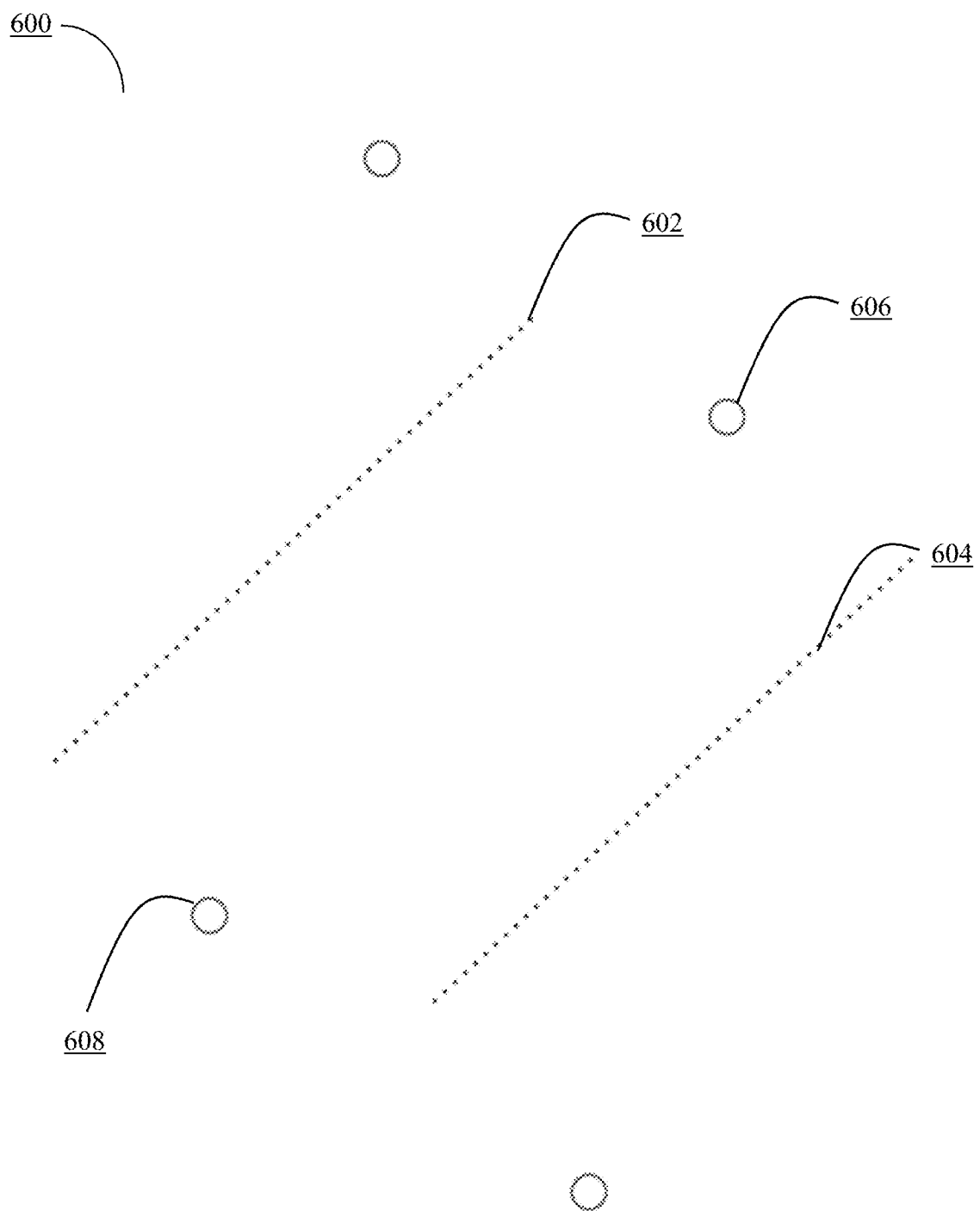
FIG. 6 illustrates an example of a field map including waypoint data, in accordance with an embodiment of the present subject matter.

Referring now to FIG. 6, an example of a field map (600) comprising row 1 (602) of crops and row 2 (604) of crops, and waypoint data comprising row entry point (606), and row exit point (608).

Figure 7:
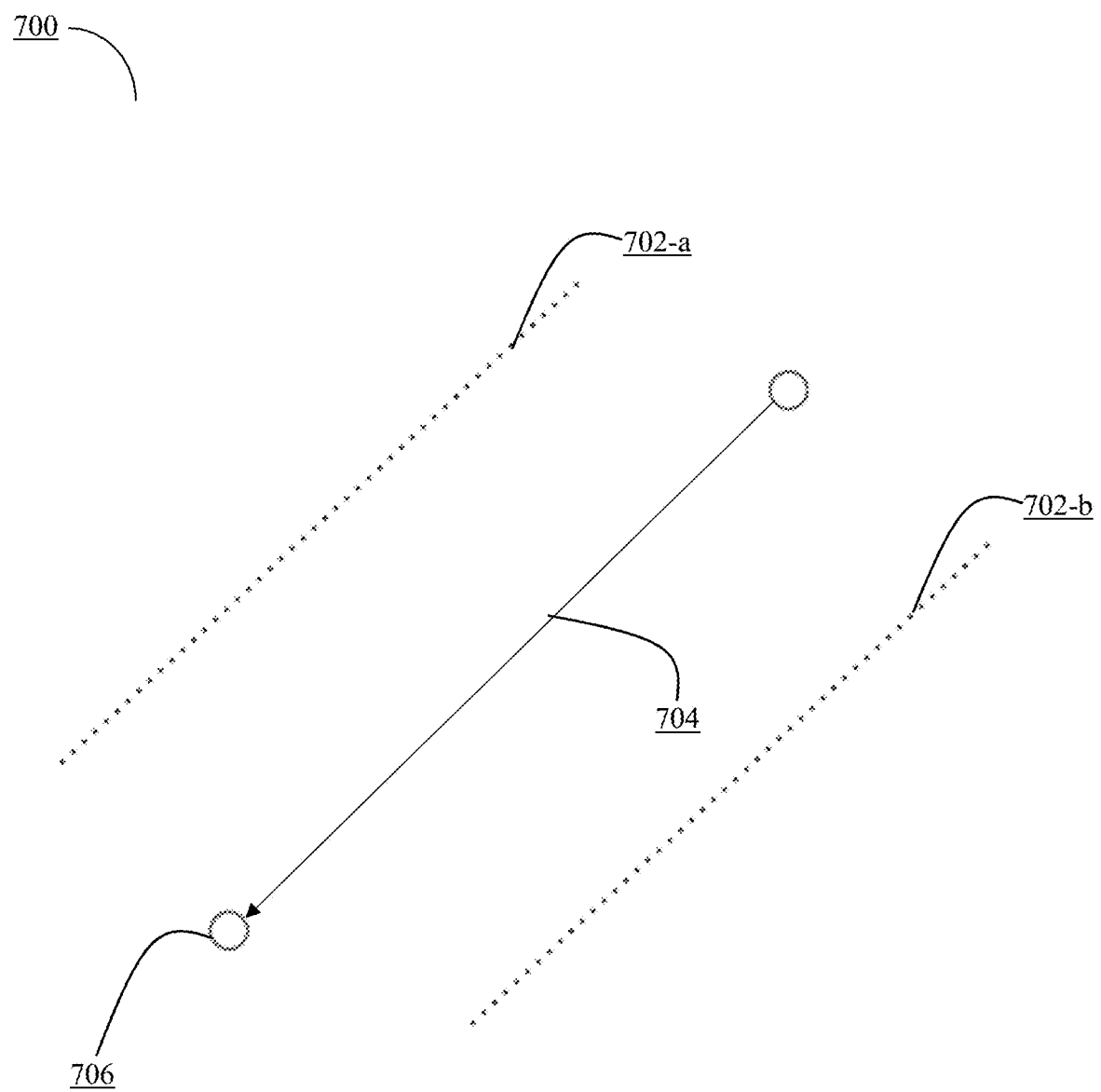
FIG. 7 illustrates an example of a reference map, in accordance with an embodiment of the present subject matter.

Referring now to FIG. 7, an example of a reference map (700) having a plurality of rows of crops (702-a, 702-b), a path the robot should follow to reach the target location (704), and the target location (706).

Figure 8:
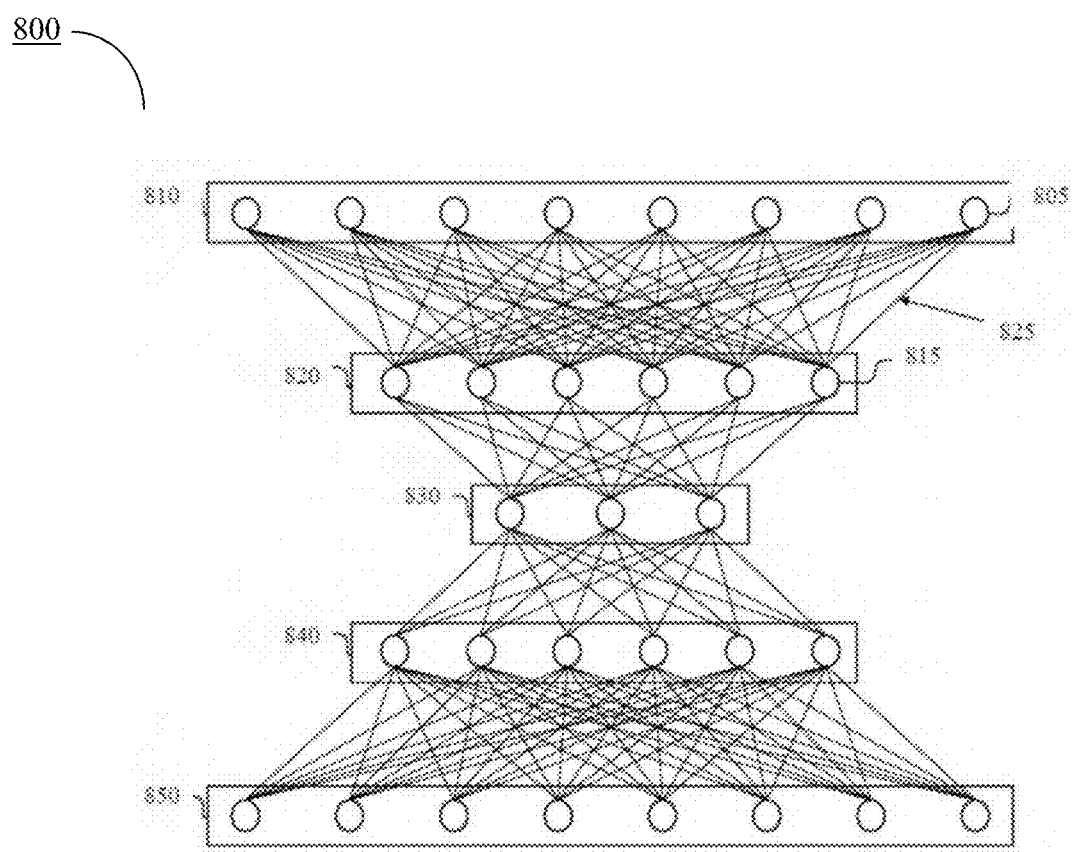
FIG. 8 illustrates an example of an artificial neural network, in accordance with an embodiment of the present subject matter.

Referring now to FIG. 8 that illustrates an example artificial neural network ("ANN") 800 of the machine learning algorithms. Machine learning algorithms use ANN to train for producing outputs for a set of inputs. In an exemplary embodiment, an ANN may refer to a computational model comprising one or more nodes. Example ANN (800) may comprise an input layer (810), hidden layers (820, 830, 840) and an output layer (850). Each layer of the ANN (800) may comprise one or more nodes, such as a node (805) or a node (815). In particular embodiments, each node of an ANN may be connected to another node of the ANN. As an example, and not by way of limitation, each node of the input layer (810) may be connected to one of more nodes of the hidden layer (820). In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 8 depicts a connection between each node of the input layer (810) and each node of the hidden layer (820), one or more nodes of the input layer (810) may not be connected to one or more nodes of the hidden layer (820).

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 840. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example, and not by way of limitation, a connection (825) between the node (805) and the node (815) may have a weighting coefficient of 0.4, which may indicate that 0.4 multiplied by the output of the node (805) is used as an input to the node (815). In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example, and not by way of limitation, training data may comprise inputs to the ANN 800 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method may help in may prevent damage to crops due to robot crashing into a row of crops.

Some embodiments of the system and the method may reduce time taken for a robot to traverse an agricultural field.

Some embodiments of the system and the method may reduce time of recovering a robot from the agricultural field in case the robot crashes.

Some embodiments of the system and the method provides a more accurate and efficient method for navigating under-canopy robots in a variety of environments, including agricultural fields, using a combination of sensor data and digital mapping.

Some embodiments of the system and method may help in ensuring that tasks, such as planting and harvesting, are performed consistently, leading to more predictable crop yields.

Some embodiments of the system and the method enable performing an agricultural treatment in agricultural fields with poor GPS, GNSS connectivity.

Some embodiments of the system and the method may ensure that the robot is able to return to its navigation path quickly and safely in the event of unexpected obstacles or deviations using the recovery mode.

Although implementations for methods and system for navigating a robot have been described in language specific to structural features and/or methods, it is to be understood that the appended claims are not necessarily limited to the specific features or methods described. Rather, the specific features and methods are disclosed as examples of implementations for navigating a robot.

The invention claimed is:

1. A method for navigating a robot, the method comprises:
receiving a target location, a field map, sensor data from a robot, and a robot location;
determining a navigation mode based on the robot location and the sensor data using a supervision model, wherein the navigation mode is one of an under-canopy mode, an out-row mode, and a recovery mode, and wherein the sensor data comprises kinetic data and image data;
generating a reference map based on the navigation mode using the supervision model; and
navigating the robot based on the reference map using at least a control model, a path tracking model and a recovery model by:
accessing at least one of Global Navigation Satellite Systems (GNSS), Real-Time Kinematics (RTK), and a waypoint data when the robot is in the out-row mode;
analysing at least one of Light Detection And Ranging (LiDAR) perception data, and image data when the robot is in the under-canopy mode; and
generating a recovery reference path, when the robot is in the recovery mode.

2. The method of claim 1, wherein the kinetic data comprises traction, angular momentum, a head direction, a forward velocity, and an angular velocity.

3. The method of claim 1, wherein the image data comprises at least one or more images of areas surrounding the robot, and 3D models, wherein the one or more images are at least depth images and Red Green Blue (RGB) images, and wherein the 3D models are captured using a ranging sensor.

4. The method of claim 1, wherein the target location is a destination.

5. The method of claim 1, wherein the target location is a destination and one or more intermediate checkpoints.

6. The method of claim 1, wherein the robot location is received from one or more location sensors including GNSS and Global Positioning System (GPS).

7. The method of claim 1, wherein the field map comprises locations of physical features in the field including crop rows, obstacles, and boundaries, and wherein the field map is a digital representation of an area.

8. The method of claim 1, wherein the reference map comprises a path to be followed by the robot to reach the target location, and images of surroundings of the robot, and wherein the reference map is generated using GNSS data, GPS data, the field map, the target location, the sensor data, and the robot location.

9. The method of claim 1, wherein the waypoint data is recorded by a manually controlled robot, and wherein the waypoint data comprises at least an entry point, and an exit point for a row in an agricultural field.

10. The method of claim 1, wherein the waypoint data is included in the field map.

11. The method of claim 1, wherein generating the recovery reference path comprises predicting robot state using a sensor fusion method based on the kinetic data, and wherein the recovery reference path is generated using a recovery model, and wherein the recovery reference path is generated by at least one of,
continuous monitoring of traction between wheels of the robot and ground using one or more kinetic sensors, and
detecting failure of the robot to navigate, and
wherein the recovery reference map is generated based on at least one of historic values of traction, a field map comprising layout of an agricultural field where the robot is traversing, and image data comprising images of surroundings of the robot.

12. The method of claim 1, wherein the supervision model is a machine learning model, and wherein the supervision model is trained using a training data comprising labelled sensor data, wherein the sensor data is labelled with a navigation mode, and wherein the supervision model is trained using at least a supervised learning technique, reinforcement learning technique, and a self-supervised learning technique.

13. The method of claim 1, wherein the control model, the path tracking model, and the recovery model are machine learning models, and wherein the control model, the path tracking model, and the recovery model are trained to generate an output using at least a supervision learning technique, reinforcement learning technique, and a self-supervised learning technique.

14. The method of claim 1, wherein the control model is used to generate commands for navigating the robot along the reference map, wherein the commands comprise turn commands, speed commands, and movement commands.

15. The method of claim 1, wherein the path tracking model is used to track and monitor the robot, being navigated along the reference map, the path tracking model continuously monitors location of the robot and an expected location, wherein the expected location is determined based on the reference map, and wherein the path tracking model provides continuous feedback to the control model.

16. The method of claim 1, wherein the navigation mode is automatically switched from under-canopy to out-row based on the location of the robot using the supervision model, and wherein the navigation mode is automatically switched to recovery mode in case of navigation failure.

17. The method of claim 1, wherein generating the recovery reference path comprises predicting robot state using a sensor fusion method based on the kinetic data, and wherein the recovery reference path is generated using a recovery model, and wherein the robot state is predicted as one of moving and stuck by using an equation $$\dot{x}(t) = \begin{bmatrix} \dot{p}_x(t) \\ \dot{p}_y(t) \\ \dot{\theta}(t) \end{bmatrix} = \begin{bmatrix} \mu \cdot \cos(\theta(t)) & 0 \\ \mu \cdot \sin(\theta(t)) & 0 \\ 0 & v \end{bmatrix} \begin{bmatrix} v(t) \\ w(t) \end{bmatrix},$$

where x(t) is the state vector composed of $\dot{p}_x(t)$ $\dot{p}_y(t)$ and $\dot{\theta}(t)$ representing position in x and y axis and heading angle respectively, where u and v are used to determine traction caused by the interaction between wheels of the robot and ground, and wherein the robot state is predicted as moving as per one of the under-canopy mode and the out-row mode when μ and v are equal to one, and wherein the robot is stuck thereby cause the robot to move as per the recovery mode when μ and v are equal to zero.

18. A system for navigating a robot, the system comprising:
a memory; and
a processor coupled to the memory, wherein the processor is configured to execute program instructions stored in the memory for:
receiving a target location, a field map, sensor data from a robot, and a robot location;
determining a navigation mode based on the robot location and the sensor data using a supervision model, wherein the navigation mode is one of an under-canopy mode, an out-row mode, and a recovery mode, and wherein the sensor data comprises kinetic data and image data;
generating a reference map based on the navigation mode using the supervision model; and
navigating the robot based on the reference map using at least a control model, a path tracking model and a recovery model by:
accessing at least one of Global Navigation Satellite Systems (GNSS), Real-Time Kinematics (RTK), and a waypoint data when the robot is in the out-row mode;
analysing at least one of Light Detection And Ranging (LiDAR) perception data, and image data when the robot is in the under-canopy mode; and
generating a recovery reference path, when the robot is in the recovery mode.

19. The system of claim 18, wherein generating the recovery reference path comprises predicting robot state using a sensor fusion method based on the kinetic data, and wherein the recovery reference path is generated using a recovery model, and wherein the robot state is predicted as one of moving and stuck by using an equation $$\dot{x}(t) = \begin{bmatrix} \dot{p}_x(t) \\ \dot{p}_y(t) \\ \dot{\theta}(t) \end{bmatrix} = \begin{bmatrix} \mu \cdot \cos(\theta(t)) & 0 \\ \mu \cdot \sin(\theta(t)) & 0 \\ 0 & v \end{bmatrix} \begin{bmatrix} v(t) \\ w(t) \end{bmatrix},$$

where x(t) is the state vector composed of $\dot{p}_x(t)$ $\dot{p}_y(t)$ and $\dot{\theta}(t)$ representing position in x and y axis and heading angle respectively, where μ and v are used to determine traction caused by the interaction between wheels of the robot and ground, and wherein the robot state is predicted as moving as per one of the under-canopy mode and the out-row mode when µ and v are equal to one, and wherein the robot is stuck thereby cause the robot to move as per the recovery mode when µ and v are equal to zero.

* * * * *